Figure 1:
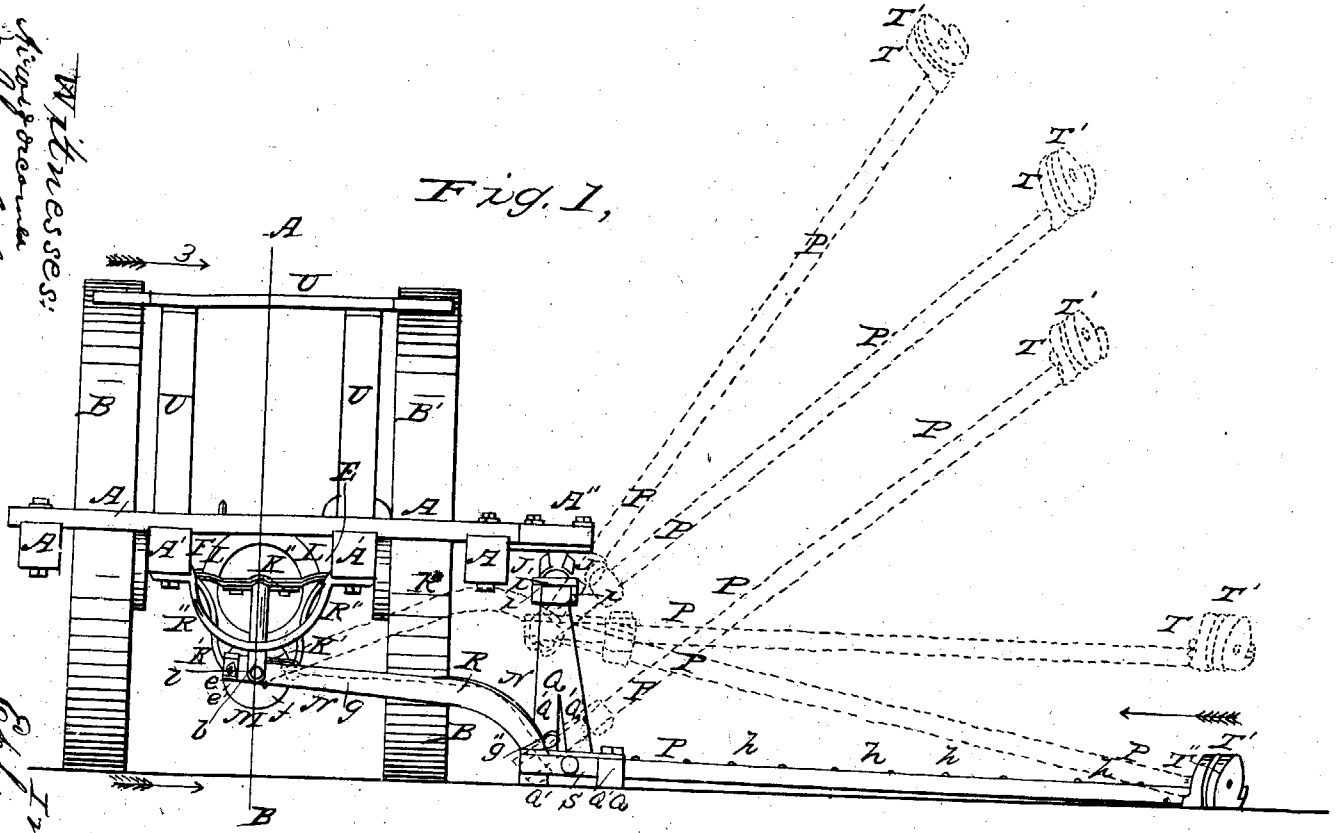

3 Sheets—Sheet 1.

E. BALL.

Mower.

No. 1,009.

Reissued July 17, 1860.

Witnesses:
A. W. Goodrich
N. Yoshi Ackee

Inventor:
Ephraim Ball
By his Attorney
Thos. H. Dodge

N. PETERS, Photo-Lithographer, Washington, D. C.

E. BALL.
Mower.
3 Sheets—Sheet 2.
No. 1,009.
Reissued July 17, 1860.
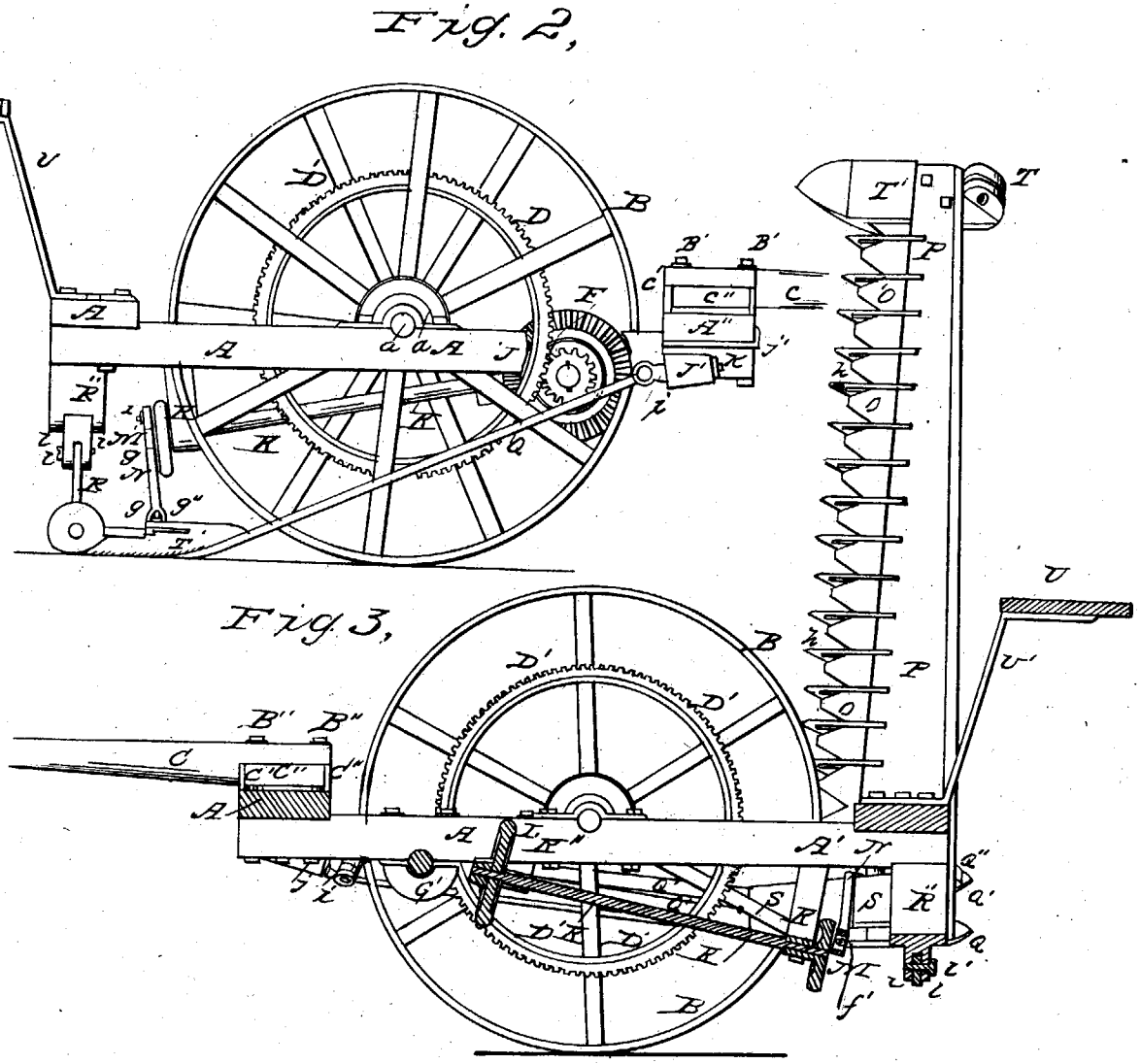
Fig. 2,
Fig. 3,
Witnesses:
A. Wurdsamer
W. Yorke Stone
Inventor:
Ephraim Ball
By his Attorney
Thos. H. Dodge
N. PETERS, Photo-Lithographer, Washington, D. C.

3 Sheets—Sheet 3.
E. BALL.
Mower.
No. 1,009.
Reissued July 17, 1860.
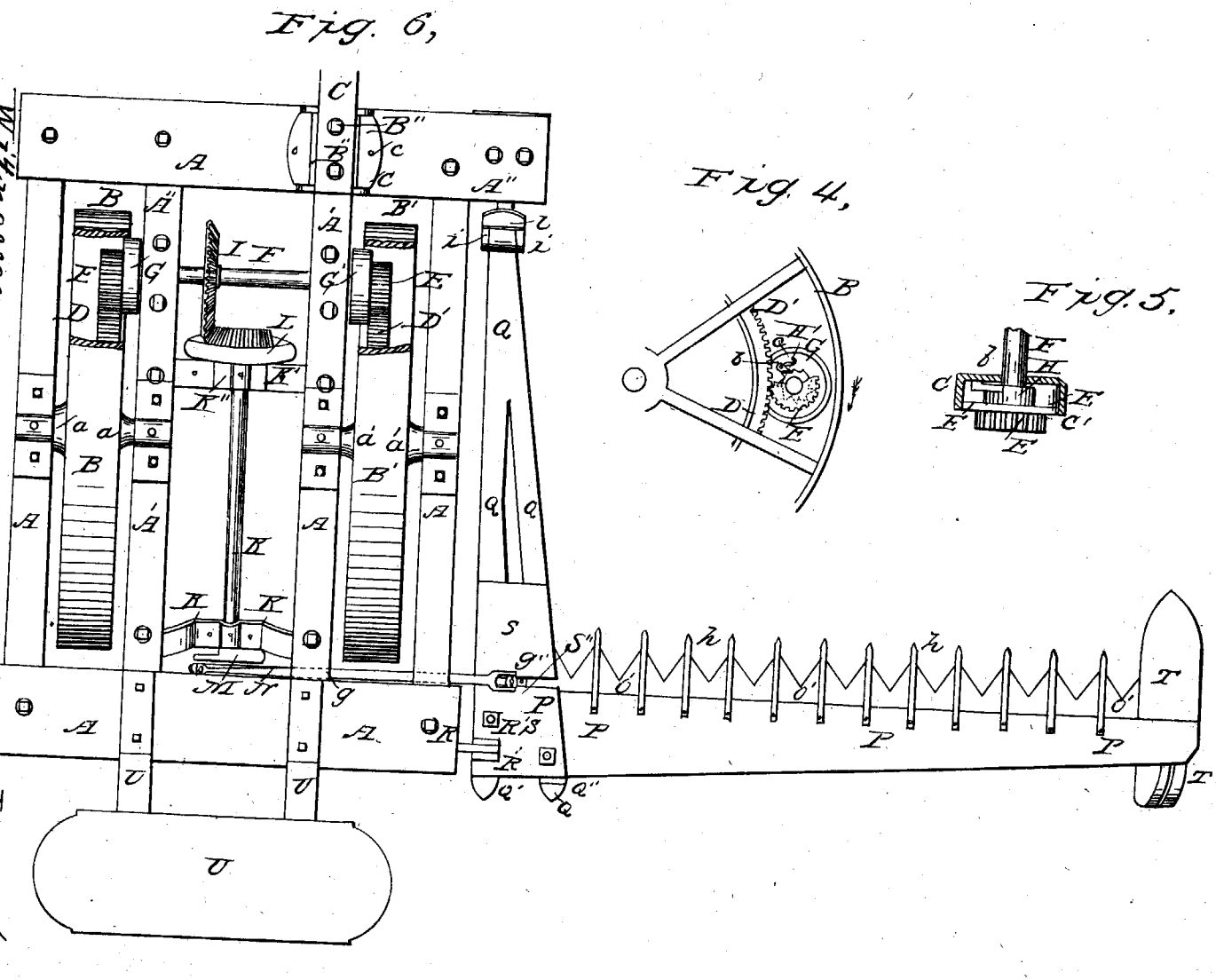
Witnesses:
A. C. Wightman
D. Yorke Allen
Inventor:
Ephraim Ball
By his Attorney
Thos. H. Dodge Jr.
N. PETERS, Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No 831, dated September 27, 1859; Reissue No. 1,009, dated July 17, 1860.

DIVISION C.

*To all whom it may concern:*

Be it known that I, EPHRAIM BALL, of Canton, in the county of Stark, in the State of Ohio, have invented certain new and useful Improvements in Mowing-Machines, of which the following is a full, clear, and exact description, reference being had to the accompanying drawings, which make a part of this specification, and in which—

Figure 1 represents a rear view of the machine, the black lines showing the finger-beam resting upon the ground in the position it will occupy when the machine is mowing on a level surface, the blue lines showing one position of the finger-beam when mowing on an uneven surface, with its left end raised to conform thereto, the red line showing the position of the finger-beam when mowing on an uneven surface, which raises the entire finger-beam, the dotted black lines showing the position of the finger-beam at its right or outer end toward the machine to pass over an obstacle, and the dotted red lines showing the finger-beam in two different positions raised off the ground and turned up toward the machine to pass over obstacles or through gates. Fig. 2 represents a side view of the machine, looking in the direction of arrow 1, Fig. 1, when the machine is moving on level ground, a part of the main frame being represented as broken away to show the position of the gearing. Fig. 3 represents a section on a line, A B, Fig. 1, looking in the direction of arrow 3, the finger-beam being shown in the highest position represented in red dotted lines, Fig. 1. Fig. 4 represents a detached view of a portion of one of the main wheels and a portion of its gearing, a part of the pinion which gears into one of the main gear-wheels being represented as broken away, together with its shield, to show one of the ratchet-wheels with its pawls, spring, and case, and by which motion is communicated from the main wheels to the main gear-shaft. Fig. 5 represents a detached plan or top view of one of the pinions on the main gear-shaft, together with its ratchet-wheel and pawl, the top of the case which covers the ratchet-wheel being represented as broken away to show the relative position of the parts. Fig. 6 represents a plan or top view of my machine, a portion of the peripheries of the wheels B B′ being broken away to show the position of the gear-wheels.

Whenever it may be expedient to use one or more of the several parts or branches of my improvements separate from the rest, such part or parts may be used in connection with the proper frames and gearing, although different from those herein described, which are proportioned and arranged with reference to the use of the whole of the parts together; and it is obvious that several parts of my improvements are applicable to various other mowing-machines in use.

One mode of applying each of my improvements to practical use being shown in this machine, it is unnecessary to specify the manner of applying the parts, respectively, to other mowing-machines, since the ordinary skill of the constructer will be sufficient for that purpose.

That branch of my improvements which is the subject of this patent consists, first, in so arranging and combining the hangers which support the crank-shaft and left end of the coupling-arm with certain parts of the main frame as that the hangers shall answer the purpose of a series of braces to the main frame to keep it from twisting during the operation of mowing.

It also further consists in so constructing and combining the hinged cutting apparatus and finger-beam with a main frame as that no part of the finger-beam shall project by the rear of the main frame, nor any portion of the main frame by the rear of the finger-beam.

It also further consists in combining the coupling-arm and the finger-beam with the slotted metallic part S, whereby the cutting apparatus and finger-beam are prevented from falling over against the main frame when the outer end thereof is raised up toward the main frame to pass over obstructions, and whereby a portion of the weight of the finger-beam will rest on the left hinge of the coupling-arm after the outer end of the finger-beam has been raised to a certain inclination, and thus relieve the attendant from the necessity of sustaining the entire weight of the finger-beam to pass over or by an obstruction.

In the accompanying drawings, A A A′ A′ represent the main frame of the machine, being of rectangular form, and which is supported on the axles *a a′* of the independent driving and supporting wheels B B′ as it is drawn over the ground by the rigid tongue C. Spur-wheels D D′ are secured to the inner sides of the spokes of the wheels B B′, the spur-wheel D being secured to wheel B and spur D′ to wheel B′. The spur-wheels D D′ gear into small pinions E E′, which play loosely on the ends of the main gear-wheel shaft F, which runs in suitable bearings attached to the under side of the center beams, A′ A′, and near the front of the main frame.

To the shaft F there are attached two shields or cases, G G′, within each of which a pawl, *b*, is secured, and these pawls catch into ratchet-teeth on the wheels H, one of which is attached to the inner side of each of the pinion-wheels E E′, or to a disk, E″, which is placed between the ratchet-wheels H and pinion-wheels E E′, for the purpose of closing up the outer ends of the cases G G′, but which are fastened securely to their respective ratchet and pinion wheels, so that each pinion-wheel, with its disk or shield E″ and ratchet-wheel H, turn together and are loose on the shaft F. (See Figs. 7 and 8.) Small springs *c* are attached to the inside of the cases G G′, one in each case, for the purpose of keeping the pawls *b* in the ratchet-teeth of the wheels H when the machine is drawn forward, but which allows the pawls *b* to slip over the teeth on the ratchet-wheels H when the machine is backed, so that the cutters are not operated in backing the machine, nor does one pawl or ratchet interfere with the free movements of the other. Consequently if one wheel moves faster than the other it operates the cutters, and, therefore, turning the machine from the standing grass to avoid or pass obstructions in the path of the finger-beam, does not prevent the cutters from being operated by wheel B′, whereby clogging of the cutters is prevented, which is almost sure to result when the cutters are stopped under such circumstances, inasmuch as the fingers and cutters have to be drawn laterally through the standing grass, unless the team is stopped and the machine is backed, which occupies considerable time.

Near the center of the shaft F is fastened the main gear-wheel I, which gears on a bevel-wheel, J, at the upper end of the inclined crank-shaft K, which runs in suitable bearings, K′ K″, attached to the under side of the pieces A′ A′, and by which the pitman and cutters are operated. (See the drawings.)

In a mowing-machine it is important that the frame should be narrow as possible, since with a narrow frame there is much less difficulty in passing between stumps, stone heaps, and similar obstructions. With a narrow main frame, however, there is less convenience for bracing, and to enable the machine to be made narrow, and at the same time have the necessary strength to withstand the twisting strain due to the operation of the machine, I provide the main frame with two parallel center pieces, A′ A′, which are bolted or otherwise firmly fastened to the front and rear cross-pieces of the main frame. I then form and construct the hangers which support the crank-shaft K and the left end of the coupling-arm R so that they will reach from one piece A′ to the other, and to which they are firmly bolted, their centers being curved down, as shown in the drawings. By this arrangement of parts the hangers, which support the crank-shaft K and the left end of the coupling-arm R, are made to answer the further functions of strong braces to hold the main frame in its proper position, even though it is quite narrow. In mowing on rough land, quite large obstructions—such as stumps and stone heaps—are often met with, when it becomes necessary to raise or turn up the outer end of the finger-beam. This, however, involves the construction of the machine with reference to certain conditions in order to avoid several objections. First, the finger-beam must not only be hinged at its heel, but the main frame must be so constructed as to permit an attendant to freely approach the finger-beam from the rear, so as to avoid being caught in the cutting apparatus; second, the finger-beam must not be so connected or hinged to the main frame as to prevent it from being raised up at its hinged end without lifting or canting up the side of the main frame, since one person would find it very difficult, if not impossible, to hold up the finger-beam and part of the main frame while the machine was being moved; third, the connections with the heel of the finger-beam must be such as to rise with it, or else they are liable to be broken in passing over an obstruction in the path of the heel of the finger-beam; and, fourth, the construction and arrangement of the main frame must also be such that no part of it will project laterally in rear of the cutting apparatus or finger-beam, for if it does, the raising up of the finger-beam will allow the obstruction, if of any size, to strike against the laterally-projecting portion of the main frame.

In the construction of my machine all of the above conditions have been carefully observed.

The guide or metallic part S is made of three parts—viz., the part which rests on the runners Q′ Q′, just in front of the heel of the finger-beam, the part which extends back over the heel of the finger-beam, and the part under which the inner cutter works—and the whole is riveted permanently to the runners Q′ Q′ in front of the finger-beam, so that the whole device is as rigid and permanent for all practical purposes as if the parts were soldered together, or even made in one piece. The heel of the cutter-bar works in a recess, S′, formed in the part S, while the heel of the finger-beam is passed in under and in rear of the part S and above the runners Q′ Q′, where it is held by bolts passing through runners Q′ Q′, finger-beam, and part S.

In using my machine, if an obstruction happens to be in the path of the outer end of the finger-beam, raising or turning the finger-beam up toward the machine, as shown in dotted black lines, Fig. 1, is generally found sufficient. When, however, it becomes necessary to raise both the heel of the finger-beam as well as the outer end thereof, after the finger-beam has been raised into the position as shown in dotted black lines, Fig. 1, an attendant pushes the finger-beam toward the machine until the metallic part S and finger-beam P strike against the coupling-arm, when both the finger-beam and coupling-arm can be raised up, as shown in red dotted lines, Fig. 1. If it were not for the resistance afforded by the finger-beam and metallic part S, there would be danger of throwing the finger-beam over upon the machine in raising it up to pass over large obstructions or through gates, and thus endanger the safety of the driver, and also render the cutting apparatus liable to be broken. Another advantage resulting from the above arrangement is that the attendant does not have to sustain the whole weight of the finger-beam and cutting apparatus, since a portion is borne or rests on the left hinge of the coupling-arm just as soon as the finger-beam or metallic part S strikes against the coupling-arm, while before that the heel of the finger-beam is free to rest on the ground.

I do not deem a more detailed description of the machine necessary, since parts of my said machine are more fully set forth in other patents issued to me of even date herewith.

What I claim under this patent as my invention is—

1. The combination of the hangers which support the crank-shaft and coupling-arm with the central pieces, A′ A′, whereby the hangers are made to perform the additional function of braces to the main frame, substantially as set forth.

2. So constructing and combining a hinged finger-beam with a main frame as that no part of the finger-beam will project by the rear of the main frame, nor any part of the main frame by the rear of the finger-beam, whereby an attendant can freely approach the finger-beam from the rear and raise up the outer end thereof to avoid an obstruction, while the heel of the finger-beam is free to rest on the ground and to conform to the inequalities thereof independently of the up and down motions of the main frame, substantially as set forth.

3. The combination of the coupling-arm and finger-beam with the slotted metallic part S, whereby the finger-beam and cutting apparatus, when turned up toward the main frame to avoid and pass obstructions, will be prevented from falling over against the main frame, substantially as set forth.

4. The combination of the finger-beam with the coupling-arm, and a stop whereby a portion of the weight of the finger-beam, as it is raised up bodily after the outer end has been turned up to pass an obstruction, will rest on the left hinge of the coupling-arm, substantially as and for the purposes set forth.

In witness whereof I have hereunto signed my name.

EPHRAIM BALL.

Witnesses:
DANIEL GOTSHALL,
D. H. HARMER.